May 15, 1962 H. EPPERLEIN 3,034,284
CONTACT DEVICE FOR ELECTRIC WATCHES
Filed Nov. 19, 1958 2 Sheets-Sheet 1
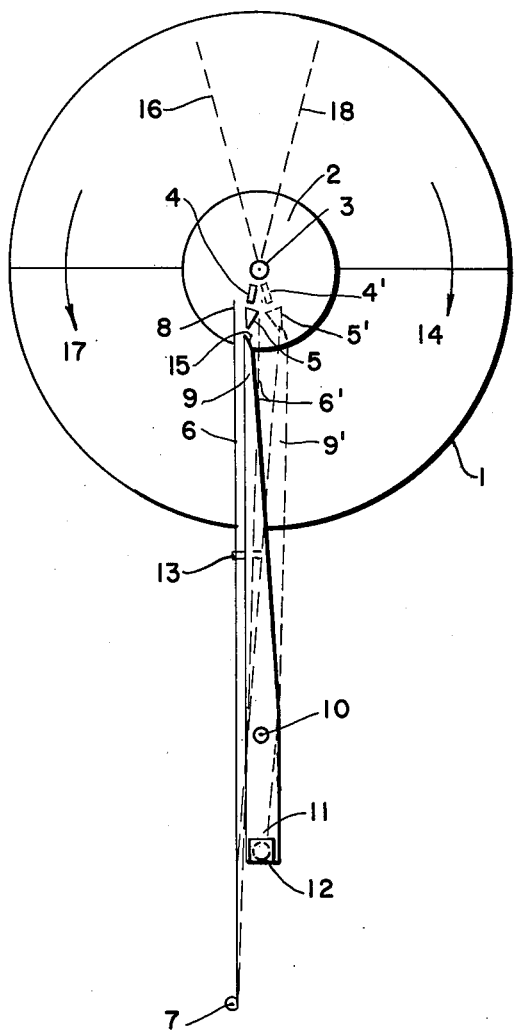
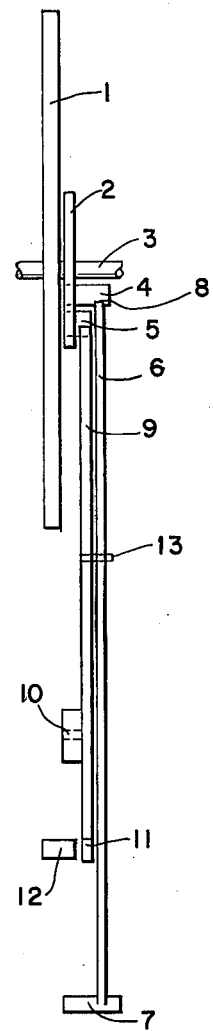
FIG. I.   FIG. 2.
INVENTOR.
Helmut Epperlein
BY
Diggins & LeBlanc
Attorneys May 15, 1962   H. EPPERLEIN   3,034,284
CONTACT DEVICE FOR ELECTRIC WATCHES
Filed Nov. 19, 1958   2 Sheets-Sheet 2

INVENTOR
Helmut Epperlein

BY Diggins & Le Blanc
ATTORNEYS

United States Patent Office 3,034,284
Patented May 15, 1962

3,034,284
CONTACT DEVICE FOR ELECTRIC WATCHES
Helmut Epperlein, Ersingen, near Pforzheim, Germany, assignor to Hamilton Watch Company, Lancaster, Pa., a corporation of Pennsylvania
Filed Nov. 19, 1958, Ser. No. 775,039
9 Claims. (Cl. 58—28)

This invention relates to battery operated electric watches and more particularly relates to a contact system for a battery operated electric watch of the type having a coil carried by its balance staff.

In a certain type of known electric watch, the balance wheel carries a small coil which, through a suitable contact arrangement, is connected to a battery for a short period of time during each complete oscillation. The coil moves through a permanent magnetic field at the time that it is connected to the battery so that it is subjected to a brief driving impulse to maintain the oscillation imparted by the hair spring. The oscillation of the balance wheel actuates an indexing arrangement which is driven one tooth per oscillation of the balance wheel in order to drive the train of the watch. The foregoing constructional characteristics are understood by those skilled in the art and form no part of the present invention and thus are not illustrated in further detail.

The instant invention relates to an improved contacting system for periodically connecting the movable coil to the battery in a battery operated watch. A contact is mounted for rotation with the balance staff and a contact spring is mounted so that an end is engageable by the rotating contact. According to an important feature of the invention an actuating means is provided in order to insure that at the time of contact the rotating contact and the contact spring end are moving in the same general direction but the latter is moving considerably faster than the former. This insures a reliable contact and may be provided through a simple mechanical arrangement.

According to one embodiment of the invention, the contact device comprises a contact spring which cooperates with a pivotally mounted lever maintained in position by a magnetic force. The contact spring is longer than the lever and its end carries a high conductivity contact point which cooperates with a contact carried by a roller plate on the balance staff. The end of the lever, on the other hand, cooperates with a jewel carried by this same roller.

During oscillation of the balance wheel in one direction, the lever is engaged by the jewel and moved from its neutral position in one direction thereby moving the end of the contact out of the path of the contact on the roller. During movement of the balance wheel in the opposite direction, the jewel engages the lever from the other direction, moves it out of its neutral position and through a suitable connection between the lever and contact spring, moves the contact point at the end of the contact spring into engagement with the contact carried by the roller.

According to another embodiment of the invention the contact device comprises a pair of parallel springs which extend toward the balance staff and are linked together by an eye or other similar arrangement. The ends of the springs correspond to the ends of the contact and lever in the preceding embodiment with the resiliency of the springs serving as the restoring force. The operation of this embodiment is much the same as that of the preceding embodiment.

It is accordingly a primary object of the present invention to provide an improved contact system for a battery operated electric watch.

It is another object of the invention to provide an improved contact system for a battery operated electric watch which, in one embodiment, utilizes a magnetically positioned member in the contacts system.

It is another object of the invention to provide an improved contact system for a battery operated electric watch utilizing a contact spring and a magnetically positioned pivoted lever which cooperates to provide the desired periodic energization of a coil carried by the balance wheel.

It is still a further object of this invention to provide an improved contact system for a battery operated electric watch which, in one embodiment, utilizes a pair of substantially parallel spring arms linked to one another and adopted to cooperate with a contact carried by the balance staff.

These and further objects and advantages of the invention will become more apparent upon reference to the following specification and claims and appended drawings wherein:

FIGURE 1 is a diagrammatic plan view showing a contact system constructed according to one embodiment of the present invention;

FIGURE 2 is a diagrammatic side elevation showing the contact system of FIGURE 1.

Figure 3:
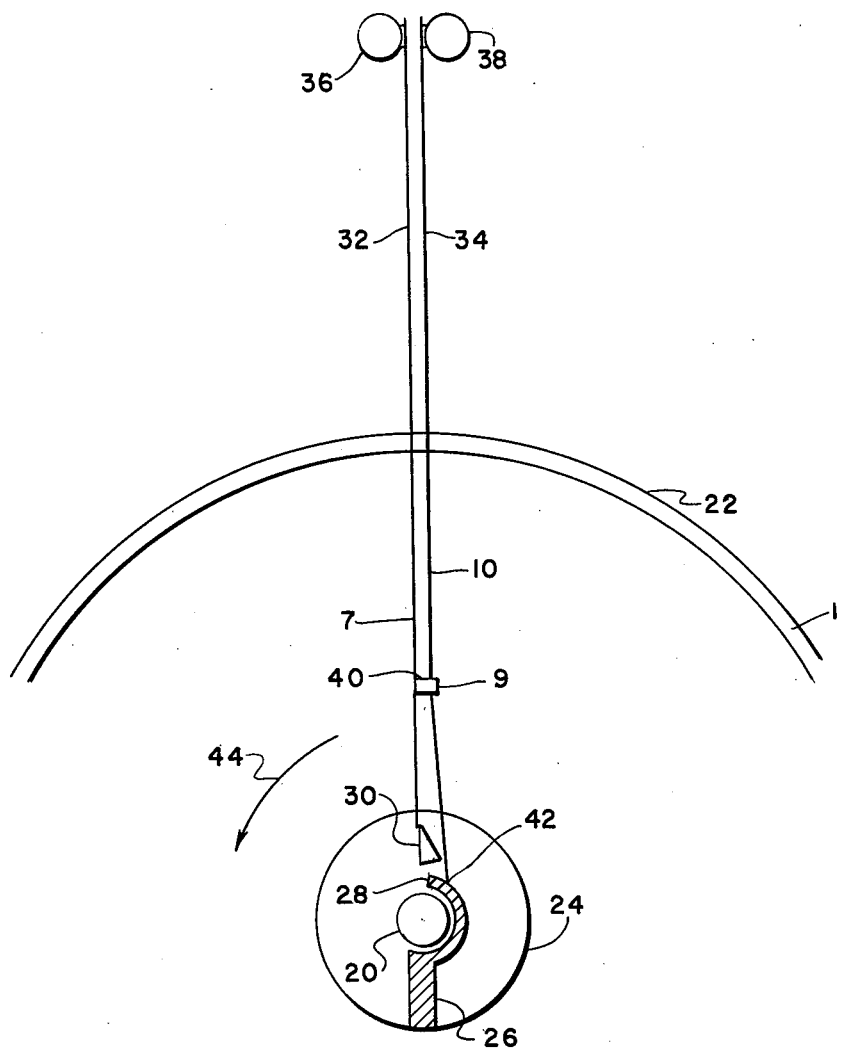
FIGURE 3 is a diagrammatic plan view showing a contact system constructed according to another embodiment of the present invention.

Referring more particularly to the FIGURES 1 and 2 of the drawing, a balance wheel 1 is carried by a balance staff 3, which also carries a metal roller plate 2 above the balance wheel as it is seen in FIGURE 2. The metal roller plate 2 is insulated from the balance staff 3. The balance wheel 1 carries a coil in a manner known to those skilled in the art and this coil has one terminal thereof connected to the balance wheel and balance staff. The other terminal of the coil is connected to a contact pin 4 which is carried by the metal plate 2. The contact pin 4 stands vertically upward from the roller plate 2 as is best seen in FIGURE 2. The roller plate 2 also carries a triangular jewel 5 which is vertically upstanding in FIGURE 2 but which is of a lesser height than the contact pin 4.

Fixedly mounted to the pillar plate of the watch on a post or other mounting 7 is an elongated spring contact 6 terminating in a precious metal tip 8 which may be formed of gold or other high conductivity metal.

A lever 9 is pivotally mounted on the pillar plate or frame of the watch at 10, parallel to and adjacent spring contact 6 and terminates in an inclined end 15, which is inclined toward the contact spring. The other end of the lever 9 carries a magnetic insert 11 which may consist of soft iron and which cooperates with a permanent magnet 12 mounted below the end of the lever in the pillar plate or frame of the watch. As will be understood by those skilled in the art, the magnet 12 positions the lever 9 and provides a restoring force if the lever is moved from its neutral position as it is depicted in FIGURE 1.

The lever 9 carries an eye 13 intermediate its inclined end 15 and the pivot 10 and the spring contact 6 passes through this eye for a purpose presently to become apparent.

The operation of this contact system is as follows:

Assuming that the spring contact 6 and lever 9 are in the positions shown in solid lines in FIGURE 1, when the balance wheel rotates in a clockwise direction as indicated by the arrow 14, the apex or edge of the triangular jewel 5 engages the inclined surface 15 of the lever 9 to slightly rotate this lever in a counterclockwise direction against the holding force of the permanent magnet 12. As the lever 9 rotates, it will carry spring contact 6 along with it by means of eye 13 so that the contact point or tip 8 of spring contact 6 is moved out of the circular path of the contact pin 4 on the roller table 2. As a consequence no contact occurs between the contact tip 8 and the contact pin 4 during movement of the balance wheel in this direction.

As the jewel 5 slips off the inclined end 15 of the lever 9, the lever is returned to its neutral position by the magnet 12, as shown by the solid lines in FIGURE 1, and the spring contact 6 also returns to its neutral position by reason of its resiliency. The balance wheel completes its oscillation in this direction until the jewel 5 reaches the position indicated by the broken line 16. The balance wheel then reverses its direction of movement and now rotates in a counterclockwise direction as indicated by the arrow 17.

As the balance wheel rotates in the direction 17, the jewel 5 engages the left side of the end of the lever 9 and carries this lever into the position shown by the broken lines at 9'. At the instant that movement begins, the contact pin on the roller table 2 passes the contact tip 8 without engaging it. As the jewel 5 begins to move the lever 9 from its neutral position, the spring contact 6 is carried to the right by the eye 13 and engages the contact pin on the roller table 2. This contact places the coil carried by the balance wheel in circuit with the battery to provide the necessary impulse in order to sustain the oscillation of the balance wheel. This contact continues until the spring contact reaches the position shown by the broken line at 6' in FIGURE 1, at which time the contact pin on the roller table 2 reaches the position indicated by the broken line at 4'. At this instant, the jewel 5 occupies the position indicated by the broken lines at 5' and slides off of the end of the lever 9, which occupies the position 9'. The lever is now returned to its neutral position by the permanent magnet 12, the contact tip 8 is detached from the contact pin 4 on the roller table 2 and the spring contact 6 returns to its neutral position. The balance wheel now completes its oscillation in the direction of the arrow 17 until the jewel 5 has reached the position indicated by the broken line 18. At this point, the movement of the balance wheel is again reversed and the foregoing process repeated.

By means of the contact device of this invention a reliable contact is obtained in view of the fact that the velocity of movement of the contact tip 8 at the time that contact is made is greater than the initial velocity of the contact pin 4. This is due to the fact that the contact tip 8 is moved by means of the lever 9 and eye 13 in accordance with the radius arm provided by the jewel 5 rather than the shorter radius arm of the contact pin 4 which determines its velocity. The contact between the tip 8 and the contact pin 4 is interrupted rapidly in view of the fact that the contact pin 4 is moving away from the spring contact in the direction of the arrow 17 at the instant of interruption. The contact tip 8, on the other hand, is moving in the opposite direction as a result of the return of the lever 9 which takes the spring contact 6 with it.

Referring now to FIGURE 3, there is seen another embodiment of the contact system of the invention wherein a balance staff 20 carries a balance wheel 22 and a roller table 24. A contact 26 is attached to the roller table 24 and terminates in an upstanding contact pin 28 similar to the roller carried contact in the preceding embodiment. The roller 24 also carries a triangular jewel 30.

A pair of substantially parallel spring arms 32 and 34 are affixed to the pillar plate or watch frame by means of a pair of posts 36 and 38. The spring 32 is disposed below the spring 34 as in the preceding embodiment of the invention, but carries an eyelet 40 through which the spring 34 passes. The end of spring 34 extends beyond and over jewel 30 and terminates in a contact tip 42.

The operation of this embodiment of the invention is as follows:

As the balance wheel 22 rotates counterclockwise in the direction of the arrow 44, the apex or tip of the triangular jewel 30 engages the end of the spring 32. This spring is then bent outward to the left and the eyelet 40 carries the spring 34 to the left. Shortly after this movement occurs, the contact tip 42 at the end of spring 34 engages the contact pin 28 on the roller table 24 to energize the coil carried by the balance wheel. The contact tip 42 then springs away from contact pin 28.

The movement of the balance wheel in the opposite direction brings the edge of jewel 30 into engagement with the left side of the spring 32 to force both springs 32 and 34 to the right so that contact tip 42 clears contact pin 28 and the coil on the balance wheel is not energized during this oscillation of the balance wheel. As the balance wheel then rotates again in a counterclockwise direction, the operation is repeated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An electric watch including a balance staff mounted on a stationary support and carrying a member fixed relative to said balance staff for rotation therewith, said fixed member having a contact in the form of a projection mounted on a side thereof, a second projection carried by said fixed member on said side, said contact being closer to said balance staff than said second projection and projecting outwardly from said side to a greater extent than said second projection, a pair of elongated substantially parallel members attached to said stationary support and extending toward said balance staff, one of said elongated members including bias means for positively returning it to a rest position from a deflection in either direction caused by its engagement with said second projection and being positioned so as to be engaged by said second projection during oscillation of said balance staff in each direction, the other elongated member being a contact arm the end of which extends past the path of movement of said second projection and is engageable by the portion of said contact projecting outwardly beyond said second projection, and mechanical means linking said other elongated member to said one elongated member whereby oscillation of said balance staff in one direction causes said one elongated member to move said other elongated member out of the path of said contact and oscillation of said balance staff in the opposite direction causes said one elongated member to move said other elongated member into engagement with said contact, said contact and other elongated member moving in the same direction at the time of engagement, the latter moving at a higher velocity than the former, said one member in returning to its rest position under the influence of said bias means after disengagement with said second projection moving in said opposite direction acting to positively drive said one member away from said contact to cleanly break the electrical connection therebetween.

2. A watch as set out in claim 1 wherein said linking means comprises a member attached to said one elongated member intermediate its ends and at least partially encircling said other elongated member intermediate its ends.

3. A watch as set out in claim 1 wherein said elongated members comprise parallel springs.

4. A watch as set out in claim 1 wherein said one elongated member comprises a lever pivoted to said frame.

5. A watch as set out in claim 4 wherein magnetic means is provided for positioning said lever.

6. An electric watch including a balance staff mounted on a stationary support and carrying a member fixed relative to said staff for rotation therewith, said fixed member having a contact mounted thereon; a cam member carried by said fixed member, a contact spring carried by said stationary support and extending toward the balance staff, a lever pivoted to said stationary support adjacent said contact spring and mechanically linked thereto to positively drive said contact spring in both a clockwise and counter-clockwise direction about the pivot point of said lever, said lever extending toward said balance staff, and magnetic means for positioning said lever in a neutral position, said cam member during oscillation of said balance staff in one direction engaging said lever to move said contact spring out of the path of said contact, said cam member on rotation of said balance staff in the opposite direction engaging said lever to move said contact spring into electrical contact with said contact, each movement of said lever being resisted by said magnetic means, said lever being returned to its neutral position by said magnetic means after disengagement with said member moving in said other direction whereby said lever positively drives said contact spring away from said fixed member contact to cleanly break said electrical contact therebetween.

7. A watch as set out in claim 6 wherein said cam member is at a greater distance from said balance staff than said contact.

8. A watch as set out in claim 7, wherein said magnetic means comprises a pair of magnetic members, one fixed to said stationary support and one fixed to said lever, said magnetic members having a mutual attraction.

9. A watch as set out in claim 8 wherein said lever and contact spring in their neutral positions extend parallel to one another, said mechanical link comprising an eyelet attached to said lever intermediate its pivoting axis and its end adjacent said balance staff, said eyelet encircling said contact spring.

References Cited in the file of this patent

UNITED STATES PATENTS

| | | |
|---|---|---|
| 2,401,160 | Jewell | May 28, 1946 |
| 2,644,293 | Black | July 7, 1953 |